J. S. DAVIS.
LOG HAULING TRUCK.
APPLICATION FILED SEPT. 6, 1916.
1,230,131.
Patented June 19, 1917.
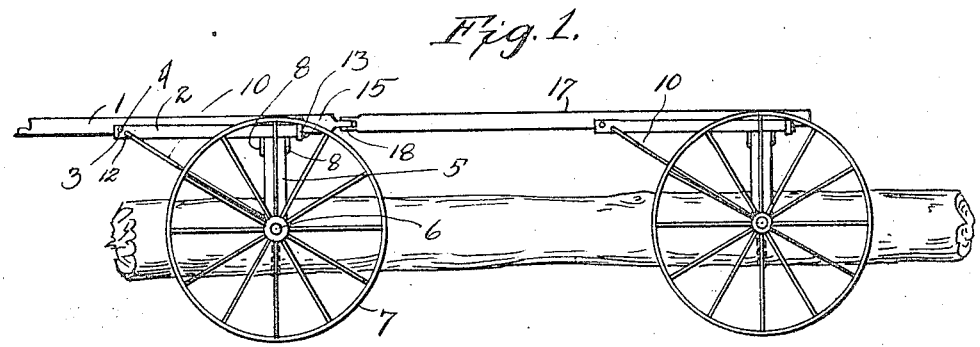
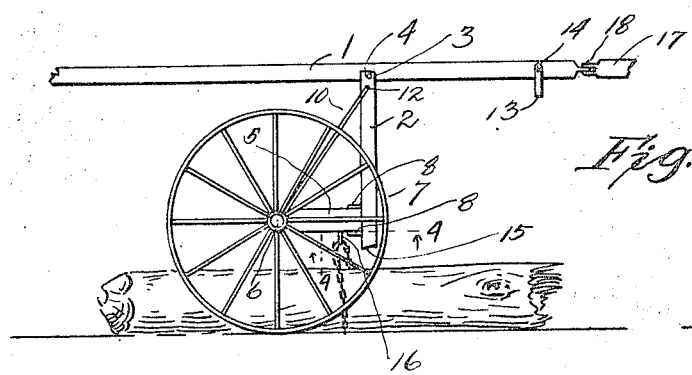
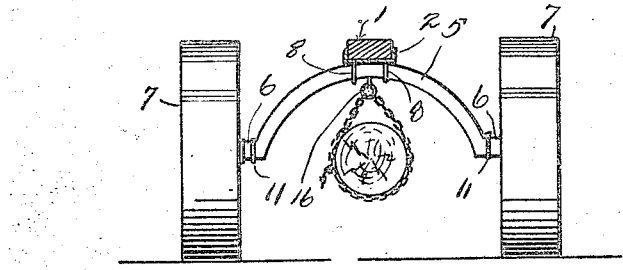
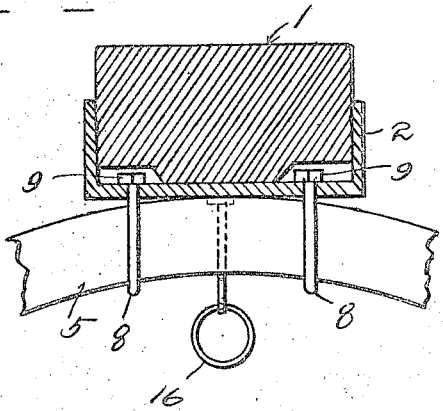
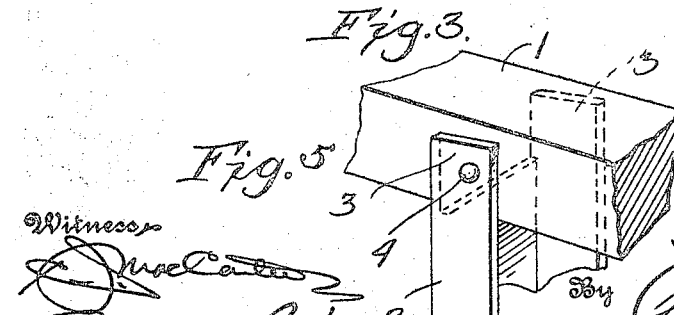
Inventor
J. S. Davis

UNITED STATES PATENT OFFICE.

JOSEPH S. DAVIS, OF YANCEYVILLE, NORTH CAROLINA.

LOG-HAULING TRUCK.

1,230,131.

Specification of Letters Patent.

Patented June 19, 1917.

Application filed September 6, 1916. Serial No. 118,742.

*To all whom it may concern:*

Be it known that I, JOSEPH S. DAVIS, a citizen of the United States, residing at Yanceyville, in the county of Caswell, State of North Carolina, have invented certain new and useful Improvements in Log-Hauling Trucks; and I do hereby declare the following to be a full, clear, and exact description of the invention, such as will enable others skilled in the art to which it appertains to make and use the same.

This invention relates to log hauling trucks.

The object of this invention is to construct an improved form of log lifting and transporting vehicle. By means of the arrangement of parts which embody the subject-matter of my invention, I am enabled to cause the forward pull of the team which will haul the loaded vehicle to elevate the log from the ground. Thus, the device does away with all the mechanism which is ordinarily necessary for lifting the log from the ground into that position where it must hang or be supported when the logs are supported in transporting position.

With the above object in view and such other objects as may hereinafter appear, my invention will now be fully set forth and described, reference being had to the accompanying drawings.

In the drawings:—

Figure 1 is a side elevation of a truck or vehicle constructed according to my invention, Fig. 2 is a side elevation of one of the truck or vehicle elements in unloaded position, Fig. 3 is a rear view of a truck element in position of Fig. 2, Fig. 4 is a section on line 4—4 of Fig. 2, and Fig. 5 is a detail perspective view of the connection between the tongue and truck element.

Referring more particularly to the drawings 1 indicates a pole or tongue, to the forward end of which a team or other motive power is adapted to be hitched. The tongue 1 is pivoted to the forward end of a beam or yoke 2, which consists, preferably, of a channel beam in which the tongue 1 is adapted to lie. The forward end of the beam or yoke 2 is cut away between the flanges to form ears 3, between which the tongue 1 is pivoted, a transverse bolt 4 serving as a pintle upon which the tongue 1 swings. Mounted upon the face of the beam or yoke 2 at or near its rear end is a carriage or axle 5 which is preferably formed of a continuous metal beam shaped into an upwardly curved arch, and has its opposite ends outturned into horizontal relation to form the axle studs 6 upon which are mounted the wheels 7. At its middle point, the arched portion of the carriage 5 is clamped to the beam 2, the clamp plates 8 being shaped to and surrounding the carriage 5 and having their ends projected through the web of the yoke or beam 2 and secured therein by means of the nuts 9.

From the ends of the arched portion of the carriage 5 to the forward ends of the beam 2 are carried the brace rods 10, the clamps 11 securing the rear ends to the carriage, and the eyelets 12 passed through the flanges of the beam 2 holding the forward ends of the rods in position. To the rear end of the tongue 1 is pivoted a strap or band 13 whose upturned ends overlie the sides of the tongue 1 and are secured thereto by means of a bolt 14 passed through the tongue and the ends, the band or strap 13 hangs below the tongue 1 a sufficient distance to swing rearwardly when the end of the yoke or beam 2 is swung into position against the tongue, said rear end of the beam 2 being beveled as at 15 to permit the strap or band 13 to ride thereover and then to drop into position therebelow, so that the beam 2 and the tongue 1 are locked together. In order to release the beam 2 from the tongue 1 the strap or band 13 must be manually swung out of its locking engagement.

From the foregoing it will be noted that I have described one of the truck sections, and that it is built to lift and support one of the ends of a log or other elongated element which it may be desired to transport.

As noted in Fig. 2, when the section is in unloaded position, the carriage 5 lies rearwardly and horizontally with relation to the axle stud 6, with the rigidly supported beam 2 standing in substantially vertical relation, and the tongue 1 swinging horizontally thereon upon its pivot 4. When the log or other element is hooked or chained to the carriage 5 as by being secured to the ring 16 mounted upon the lower side of the upper portion of the carriage 5, the tongue 1 is drawn forwardly as by driving the team or applying whatever motive power is used until the beam 2 is drawn into horizontal position, thereby swinging the rearwardly projecting end of the tongue 1 between the sides of the beam 2 and into engagement with its web portion at which time the band or strap 13 rides over the beveled ends 15 and drop below the rear end of the beam 2 thus locking the elements 1 and 2 together. Obviously the action of drawing the tongue and beam forwardly into engagement throughout their lengths elevates the arched portion of the carriage 5 into vertical position, thereby lifting whatever load is secured to the uppermost point of the arch.

The second or rear section is identical with the section above described, except that the forward end of its tongue or beam 17 is connected to the rear end of the tongue 1 by means of the universal joint 18 so that all relative movement of the tongues 1 and 17 may be provided for. It will be evident in the operation of the coupled sections that both will be dropped back simultaneously after the straps 13 have been released by backing the truck over the log to be lifted. Suitable chains or other supporting devices are then passed around the log below the truck section and engaged with the ring 16 as close to the arch of the carriage as possible. When the team is then driven forward, the log will be lifted in the manner above described, the truck sections acting simultaneously by reason of the coupling between the tongues 1 and 17.

It will be noted from the foregoing that I have constructed a truck which will permit a great saving in labor in the loading of log trucks or flat top wagons such as have been heretofore in common use, and where tongs instead of chains are used, the latter may be fixed to the rings 16 and in engaging a log may be merely opened and dropped around the latter, the lifting of the arch serving to close the tongs tightly around the log.

What I claim is:—

In a log truck, the combination of a carriage consisting of an arched element, wheels supporting said element, a channeled beam secured to said arch at its uppermost point and extending forwardly therefrom and a tongue pivoted to the forward end of the beam and adapted to fold between the sides of the channeled beam, and a locking device carried by the tongue and adapted to engage over the rear end of said beam.

In testimony whereof, I affix my signature, in the presence of two witnesses.

JOSEPH S. DAVIS.

Witnesses:
R. L. MITCHELL,
W. M. BURTON.